S. BEVAN.
Improvement in Machines for Cutting Teeth of Saws.
No. 133,190.            Patented Nov. 19, 1872.
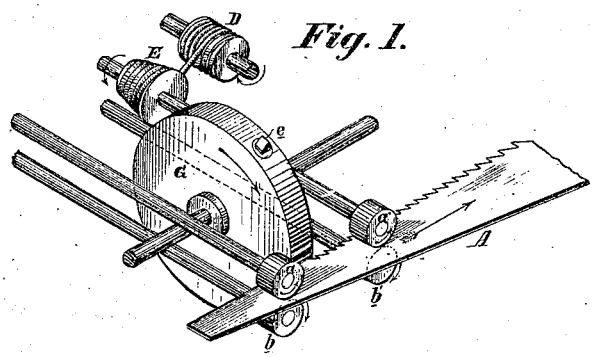
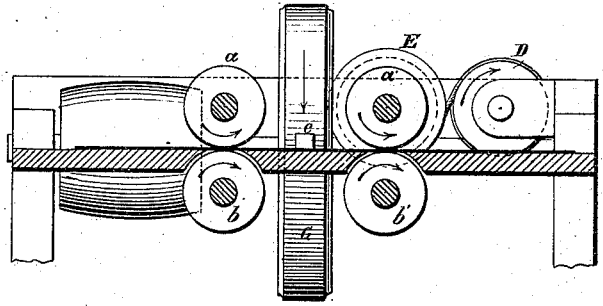
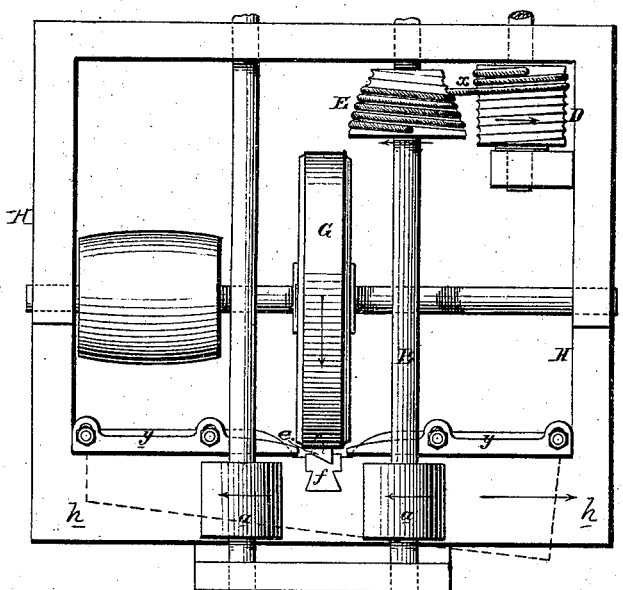

UNITED STATES PATENT OFFICE.

SAMUEL BEVAN, OF PHILADELPHIA, PENNSYLVANIA.

IMPROVEMENT IN MACHINES FOR CUTTING TEETH OF SAWS.

Specification forming part of Letters Patent No. 133,190, dated November 19, 1872.

*To all whom it may concern:*

Be it known that I, SAMUEL BEVAN, of Philadelphia, Pennsylvania, have invented a Saw-Toothing Machine, of which the following is a specification:

The object of my invention is to make on the blade of a hand-saw, with uniformity and rapidity, teeth decreasing in size from the broad to the narrow end of the blade. The nature of the mechanism by which this object is attained will be best observed in the perspective diagram, Figure 1, in which—

A is the blade, held by and between two upper rollers, $a\ a'$, the latter being a feed-roller, and two lower and similar rollers, $b\ b'$. The blade is made to traverse at a gradually-decreasing speed by causing a spirally-grooved barrel, D, revolving at a uniform speed, to unwind a chain, or its equivalent, from a tapering spirally-grooved barrel on the shaft of the feed-roller, while a cutter, attached to a rapidly-revolving disk, G, notches the blade and forms the teeth, which must necessarily be smaller as the speed of the feed-roller decreases. The machine is illustrated more in detail by the plan view, Fig. 2, and the vertical section, Fig. 3, in which, however, it has not been deemed necessary either to illustrate or describe the driving-gear of the machine. The shafts of the cutting-disk G, of the four rollers, and of the unwinding-barrel D have their bearings on a simple frame, H, the front portion $h$ of the latter forming a table on which the blade is placed, the surface of the table bearing to the rollers the relation shown in Fig. 3. In this table is secured a steel die, $f$, having a recess or notch corresponding with the pointed cutter $e$, and with the desired spaces between the teeth of the saw, the cutter, as it is carried round with the disk, passing through the notch in the die without coming in actual contact therewith; consequently, as the blade, guided by the adjustable gages $y\ y$, is caused to traverse, triangular pieces will be struck from its edge, and the desired teeth will thereby be formed. As the barrel D unwinds the chain or cord $x$ from the tapering-barrel E, the roller $a'$ must feed the blade A at a constantly decreasing speed, and hence the notches will be made closer and closer together, as the feeding continues, and the desired graduated teeth will be formed on the edge of the blade.

It will be evident that the driving-barrel D may be tapering, and the barrel E cylindrical, or that both barrels may be tapering, and arranged to feed gradually faster instead of gradually slower, with the same result, and that the blade may be clamped to a guided sliding bed, controlled by a tapering barrel and cord or chain.

I make no broad claim to the toothing of saw-blades by a cutter attached to a rapidly-revolving wheel or disk, as the same device is shown in the machine for cutting glazier-pins patented to John G. Baker, June 15, 1858, which machine has been used for cutting saw-teeth; but

I claim as my invention—

The combination, in a saw-toothing machine, substantially as described, of a tapering barrel and chain, or its equivalent, with a roller for feeding or a slide for carrying the blade.

In testimony whereof I have signed my name to this specification in the presence of two subscribing witnesses.

SAMUEL BEVAN.

Witnesses:
 WM. A. STEEL,
 HARRY SMITH.